US009551888B2

United States Patent
Lin et al.

(10) Patent No.: US 9,551,888 B2
(45) Date of Patent: Jan. 24, 2017

(54) MAGNETO-OPTICAL CRYSTAL ASSEMBLY FOR BROADBAND TEMPERATURE STABLE POLARIZATION ROTATION

(71) Applicant: Lightel Technologies, Inc., Renton, WA (US)

(72) Inventors: Shyh-Chung Lin, Bellevue, WA (US); Erin M. Casey, Kent, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 269 days.

(21) Appl. No.: 14/147,409

(22) Filed: Jan. 3, 2014

(65) Prior Publication Data

US 2015/0192804 A1 Jul. 9, 2015

(51) Int. Cl.
*G02F 1/09* (2006.01)
*G02F 1/095* (2006.01)

(52) U.S. Cl.
CPC ............... *G02F 1/09* (2013.01); *G02F 1/095* (2013.01); *G02F 2203/04* (2013.01); *G02F 2203/60* (2013.01)

(58) Field of Classification Search
CPC ........ G02F 1/093; G02F 1/09; G02B 26/2746; F02B 23/2746
See application file for complete search history.

(56) References Cited

U.S. PATENT DOCUMENTS

| | | | | |
|---|---|---|---|---|
| 5,866,092 A * | 2/1999 | Fukuda | .................... | C30B 15/00 117/945 |
| 5,892,863 A * | 4/1999 | Presby | .................... | G02F 1/011 385/16 |
| 6,757,101 B2 * | 6/2004 | Jin | ........................ | G02B 5/3025 359/280 |
| 7,050,231 B2 * | 5/2006 | Matsushita | ............. | G02F 1/093 359/280 |
| 2002/0063941 A1* | 5/2002 | Matsushita | ............. | G02F 1/093 359/280 |
| 2002/0149833 A1* | 10/2002 | Matsushita | ............. | G02F 1/093 359/280 |
| 2008/0266644 A1* | 10/2008 | Sigalas | .................. | B82Y 20/00 359/282 |

\* cited by examiner

*Primary Examiner* — Bumsuk Won
*Assistant Examiner* — Tamara Y Washington
(74) *Attorney, Agent, or Firm* — Han IP Corporation

(57) ABSTRACT

Embodiments of a magneto-optic crystal assembly for use in polarization rotation applications are disclosed. In one aspect, a magneto-optic crystal assembly includes two or more magneto-optic crystals. The temperature and wavelength dependencies of Faraday rotation of these crystals are compensated so that the crystal assembly has both reduced temperature and wavelength dependencies of the polarization rotation angle over broad temperature and wavelength ranges.

20 Claims, 10 Drawing Sheets a) Forward propagation. b) Reverse propagation.

a) Forward propagation. b) Reverse propagation.

a) Forward propagation. b) Reverse propagation.

MAGNETO-OPTICAL CRYSTAL ASSEMBLY FOR BROADBAND TEMPERATURE STABLE POLARIZATION ROTATION

TECHNICAL FIELD

The present disclosure relates to a magneto-optic crystal assembly for use in polarization rotation applications and, more particularly, to a magneto-optic crystal assembly with reduced temperature and wavelength dependencies of the Faraday rotation angle over broad temperature and wavelength ranges.

BACKGROUND

Magneto-optic polarization rotation devices have been used for various purposes in optical systems, especially in fiber optic communication, optical image processing, and sensor applications due to the non-reciprocal nature of the polarization rotation. The capability of these devices is demonstrated in FIG. 1. Faraday rotation, or the Faraday effect, is a known method for creating a non-reciprocal system. The Faraday effect allows for the realization of devices such as fiber optic isolators, circulators, and Faraday rotating mirrors. In a reciprocal system light traveling in the forward direction encounters the same system as light traveling in the reverse direction. A non-reciprocal system induced by the Faraday effect allows light traveling in the forward direction to experience a system with a magnetic field and light traveling in the reverse direction to experience a system with an opposite magnetic field, and thus a different system. In other words, in the non-reciprocal system, light traveling in the forward direction will have a polarization rotation counterclockwise or clockwise according to the magnetic field in or applied to the material of the system. Light traveling in the reverse direction will experience an opposite magnetic field and thus undergo a polarization rotation in the same direction. This will result in an additive rotation angle, as opposed to reverting to the original polarization as in a reciprocal system.

The strength of the Faraday effect for a particular material is often indicated by the Verdet constant. Depending on the material used, the Verdet constant can be positive or negative, with a positive Verdet constant corresponding to a counterclockwise rotation when the direction of propagation is parallel to the magnetic field. The Verdet constant is highly dependent on material, wavelength, and temperature.

Typically magneto-optic polarization rotation is achieved through the use of a single crystal with or without an external magnetic field. Additional optical elements may be added to create the desired effect. For example, propagation in the backward direction may be blocked as with an isolator through the use of a polarizer/analyzer set or the more currently used set of birefringent non-magneto-optic crystals that allow for an input polarization independent system. Propagation may also be redirected to a different port as with a circulator through the additional optics of a polarizing beam splitter or, in an input polarization independent system, a beam displacer. Alternatively, polarization tracking in optical systems may be achieved through the conjugate nature of the system as with a Faraday rotating mirror.

However, the temperature and wavelength-dependent nature of conventional single crystals for magneto-optic polarization rotation limits the use of magneto-optic crystal devices over broad temperature and wavelength ranges. These conventional means thus only provide the desired polarization rotation at a single wavelength and at a certain temperature. Advances in optical communication, sensors, and image processing require broadband, multi-wavelength capacities such as WDM, CWDM, DWDM, in central offices and uncontrolled field environment. Therefore, there remains a need to develop magneto-optic materials with reduced temperature and wavelength dependencies of the Faraday rotation angle over broad temperature and wavelength ranges.

SUMMARY

In one aspect, a magneto-optic crystal assembly may include two or more magneto-optic crystals. A respective Faraday effect of each of the magneto-optic crystals may be configured such that equation (1) is satisfied while equations (2) and (3) are optimized per application requirements to obtain reduced temperature and wavelength dependencies over predefined temperature and wavelength ranges:

$$\sum_{i=1}^{n} \theta_i = \Theta \qquad (1)$$

$$\sum_{i=1}^{n} \theta_i \omega_i = 0 \qquad (2)$$

$$\sum_{i=1}^{n} \theta_i \tau_i = 0 \qquad (3)$$

Here, n is a number of magneto-optic crystals contained in the crystal assembly, $\theta_i$ is a polarization rotation angle of each of the magneto-optic crystals at a given wavelength, $\Theta$ is a pre-determined total polarization rotation angle, $\omega_i$ is a wavelength coefficient of Faraday rotation for each of the magneto-optic crystals at a given wavelength and a given temperature, and $\tau_i$ is a temperature coefficient of Faraday rotation for each of the magneto-optic crystals at the given wavelength and the given temperature.

In some embodiments, the two or more magneto-optic crystals may include a counter-rotating crystal assembly.

In some embodiments, at least one of the two or more magneto-optic crystals may include bismuth-doped rare-earth iron garnet, and at least one of the two or more magneto-optic crystals may include yttrium iron garnet (YIG).

In some embodiments, the two or more magneto-optic crystals may be placed inside an external magnetic field.

In some embodiments, the two or more magneto-optic crystals may be placed sequentially and in contact.

In some embodiments, the two or more magneto-optic crystals may be crystals grown on a same substrate.

In some embodiments, the magneto-optic crystal assembly may further include an optical waveguide.

In some embodiments, the two or more magneto-optic crystals may be spaced apart.

In some embodiments, at least one of the two or more magneto-optic crystals may have a permanent internal magnetic field, and at least one of the two or more magneto-optic crystals may be placed inside an external magnetic field.

In some embodiments, the polarization rotation angle of the first crystal may be substantially 45° in a first direction and the polarization rotation angle of the second crystal may be substantially 90° in a second direction opposite to the first direction. An absolute value of the wavelength coefficient of Faraday rotation of the first crystal may be substantially equal to two times of that of the second crystal. An absolute value of the temperature coefficient of Faraday rotation of the first crystal may be substantially equal to two times of that of the second crystal.

In some embodiments, the two or more magneto-optic crystals may include a first crystal, placed inside a first external magnet having a first magnetic field, and a second crystal, placed inside a second external magnet having a second magnetic field.

In some embodiments, at least one of the two or more magneto-optic crystals may include bismuth-doped rare-earth iron garnet.

In some embodiments, at least one of the two or more magneto-optic crystals may include yttrium iron garnet (YIG), and at least one of the two or more magneto-optic crystals may include cerium-doped rare-earth iron garnet.

In some embodiments, the polarization rotation angle of the first crystal may be substantially 45° in a first direction and the polarization rotation angle of the second crystal may be substantially 90° in a second direction opposite to the first direction. An absolute value of the wavelength coefficient of Faraday rotation of the first crystal may be substantially equal to two times of that of the second crystal. An absolute value of the temperature coefficient of Faraday rotation of the first crystal may be substantially equal to two times of that of the second crystal.

In some embodiments, the two or more magneto-optic crystals may include a co-rotating crystal assembly.

In some embodiments, at least one of the two or more magneto-optic crystals may include yttrium iron garnet (YIG), and at least one of the two or more magneto-optic crystals may include a co-rotating magneto-optic crystal.

In another aspect, a magneto-optic crystal assembly may include a first magneto-optic crystal, a second magneto-optic crystal and a third magneto-optic crystal. A respective polarization rotation angle of each of the magneto-optic crystals may be configured such that the following equations (4)-(6) are satisfied simultaneously to obtain exact compensation for both temperature and wavelength decencies over predefined temperature and wavelength ranges:

$$\theta_1 = \Theta - \theta_2 - \theta_3 \quad (4)$$

$$\theta_2 = \frac{(\theta_3 - \Theta)\tau_1 - \theta_3\tau_3}{(\tau_2 - \tau_1)} \quad (5)$$

$$\theta_3 = \frac{\Theta\left(\frac{(\tau_1\omega_2 - \tau_1\omega_1)}{(\tau_2 - \tau_1)} - \omega_1\right)}{\omega_3 - \omega_1 + \frac{(\tau_3 - \tau_1)(\omega_1 - \omega_2)}{(\tau_2 - \tau_1)}} \quad (6)$$

Here, $\Theta$ is a pre-determined total polarization rotation angle, $\theta_1$, $\theta_2$, and $\theta_3$ are polarization rotation angles of the first, the second and the thirds magneto-optic crystals at a given wavelength, respectively, col, $\omega_2$, and $\omega_3$ are wavelength coefficients of Faraday rotation of the first, the second, the third magneto-optic crystals at a given wavelength and a given temperature, respectively, and $\tau_1$, $\tau_2$, and $\tau_3$ are temperature coefficients of Faraday rotation of the first, the second, and the third magneto-optic crystals at the given wavelength and the given temperature, respectively.

In some embodiments, the pre-determined total polarization rotation angle may be 45°.

In some embodiments, the two or more magneto-optic crystals may be made of bulk materials.

In some embodiments, the magneto-optic crystal assembly may include crystals not requiring an external magnet for magneto-optic functioning.

In one aspect, an optical isolator comprising the magneto-optic crystal assembly of the present disclosure is provided.

In one aspect, an optical circulator comprising the magneto-optic crystal assembly of the present disclosure is provided.

In one aspect, a Faraday rotating mirror comprising the magneto-optic crystal assembly of the present disclosure is provided.

In one aspect, a phase conjugate mirror comprising the Faraday rotating mirror of the present disclosure is provided.

Detailed description of various embodiments are provided below, with reference to the attached figures, to promote better understanding of the characteristics and benefits of the various embodiments of the present disclosure.

DETAILED DESCRIPTION OF DISCLOSED EMBODIMENTS

The present disclosure describes a magneto-optic crystal assembly that has reduced temperature and wavelength dependencies of the Faraday rotation angle over broad temperature and wavelength ranges. This may be realized through any one of three approaches: (i) using two or more counter-rotating crystals with the same slope as to both temperature and wavelength coefficients; (ii) using two or more co-rotating crystals with opposing slopes as to both temperature and wavelength coefficients; or (iii) using a combination of the previous two approaches.

A magneto-optic crystal assembly according to the present disclosure includes two or more crystals with each exhibiting a respective Faraday effect with or without the presence of an external magnetic field, such that Equation (1) in the following is satisfied while Equations (2) and (3) are optimized per application requirements.

$$\sum_{i=1}^{n} \theta_i = \Theta \quad (1)$$

$$\sum_{i=1}^{n} \theta_i \omega_i = 0 \quad (2)$$

$$\sum_{i=1}^{n} \theta_i \tau_i = 0 \quad (3)$$

In Equations (1)-(3), n is a number of magneto-optic crystals used, $\theta_i$ is a polarization rotation angle of each crystal at a given wavelength and temperature, $\Theta$ is a pre-determined total polarization rotation angle, $\omega$ is a wavelength coefficient of Faraday rotation for each of the magneto-optic crystals at a given wavelength and temperature, and $\tau_i$ is a temperature coefficient of Faraday rotation for each of the magneto-optic crystals at a given wavelength and temperature. When Equations (1)-(3) are satisfied simultaneously, the resulting crystal assembly has reduced temperature and wavelength dependencies of the Faraday rotation angle over broad temperature and wavelength ranges, or over at least a predefined temperature range and a predefined wavelength range.

Embodiment 1

Figure 1:
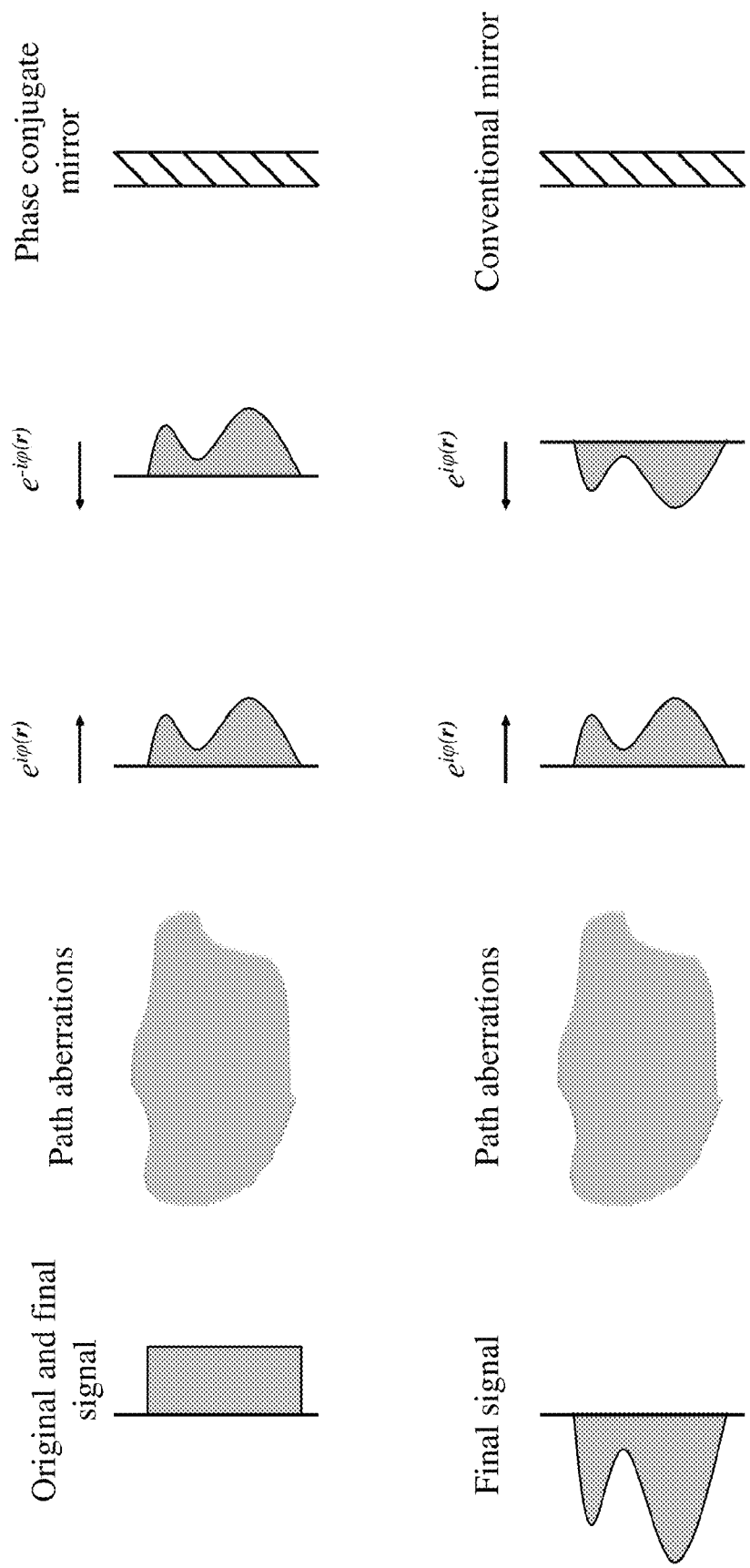
FIG. 1 is a diagram of a phase conjugate mirror and a comparable conventional mirror.
Figure 2:
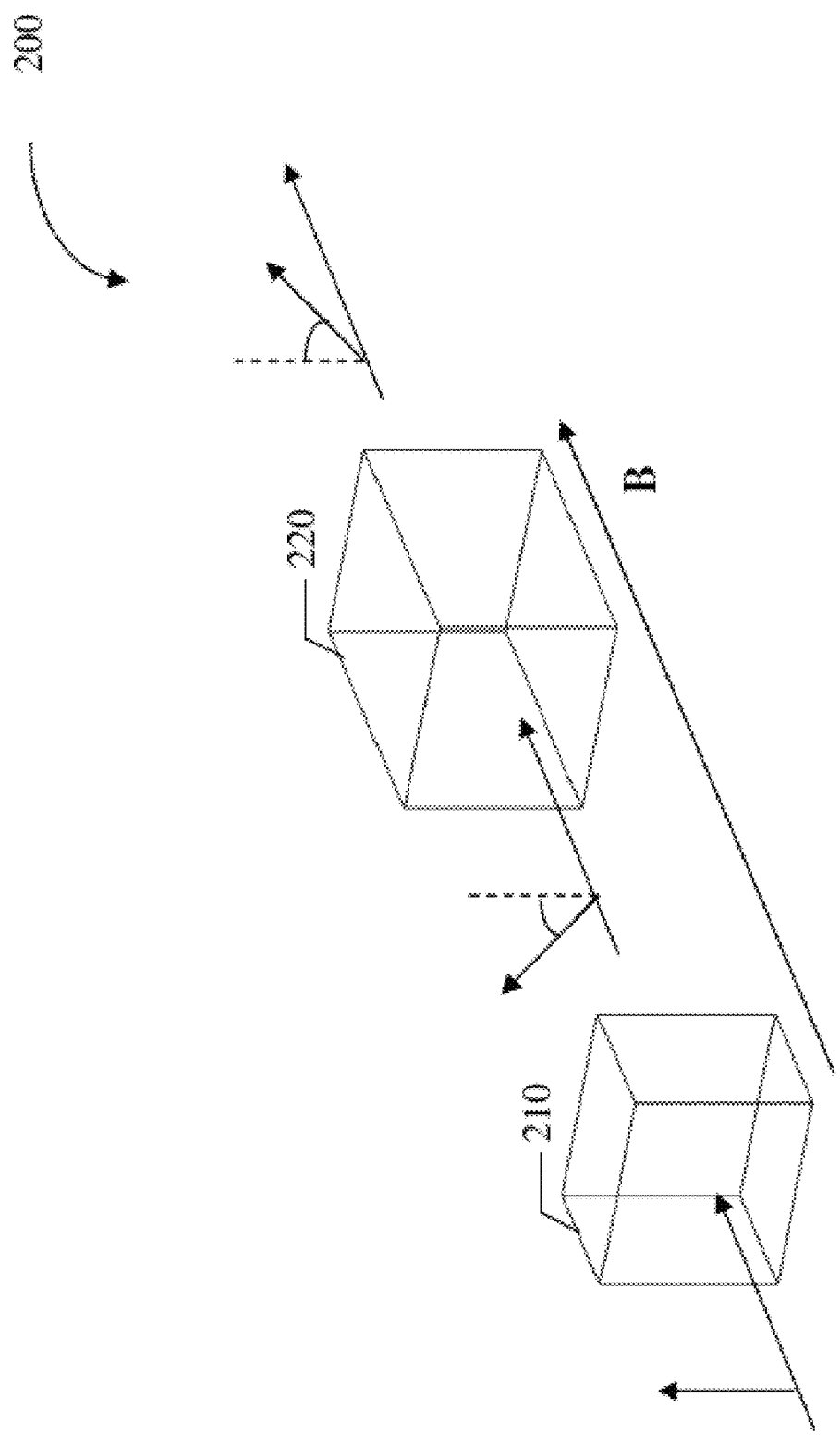
FIG. 2 is a diagram showing polarization rotation when light propagates through a magneto-optical crystal assembly under a given magnetic field B in accordance with one embodiment of the present disclosure.
Figure 3:
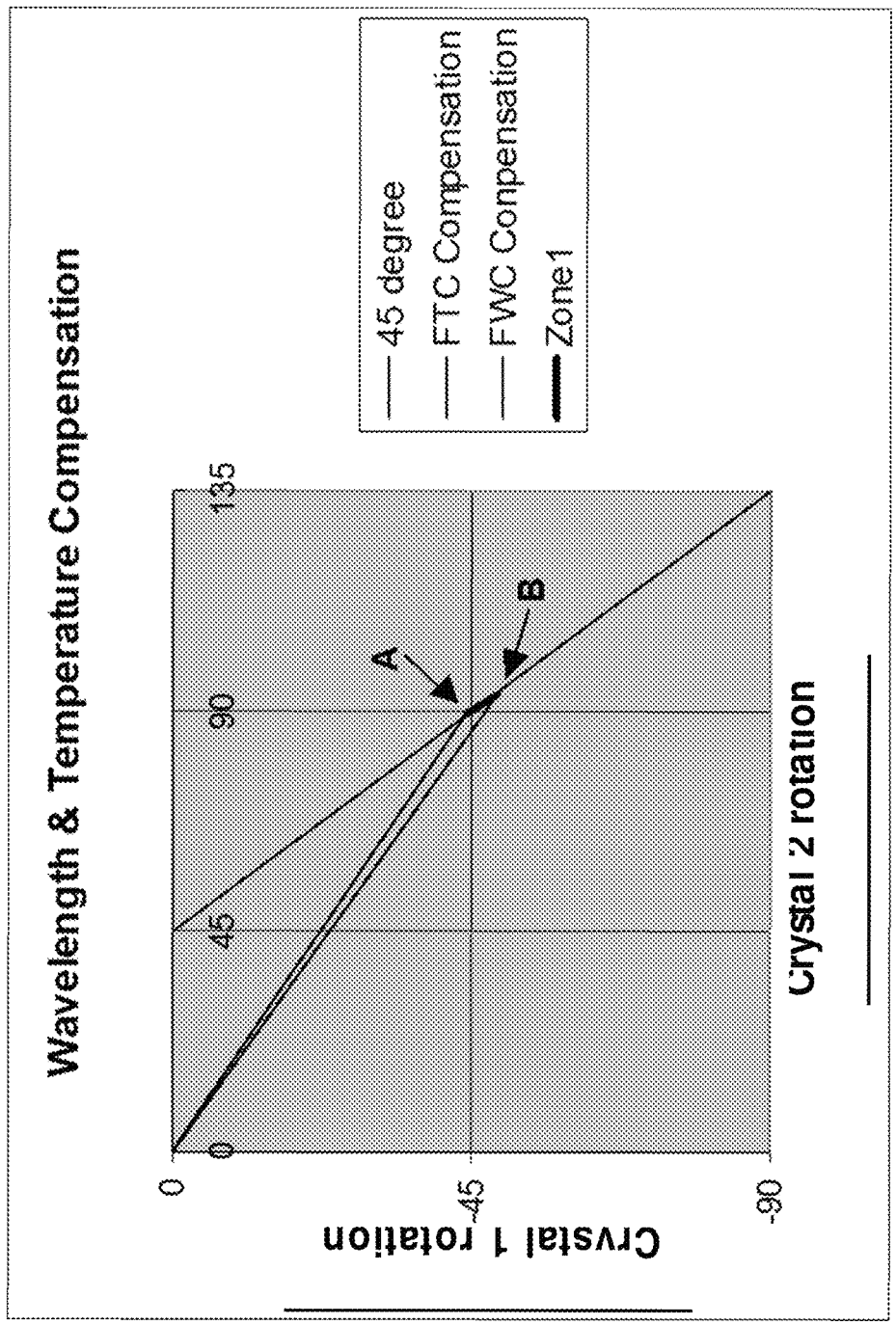
FIG. 3 is a graph showing a relationship between individual crystals in the magneto-optical crystal assembly of FIG. 2 for wavelength and temperature compensation.
Figure 4:
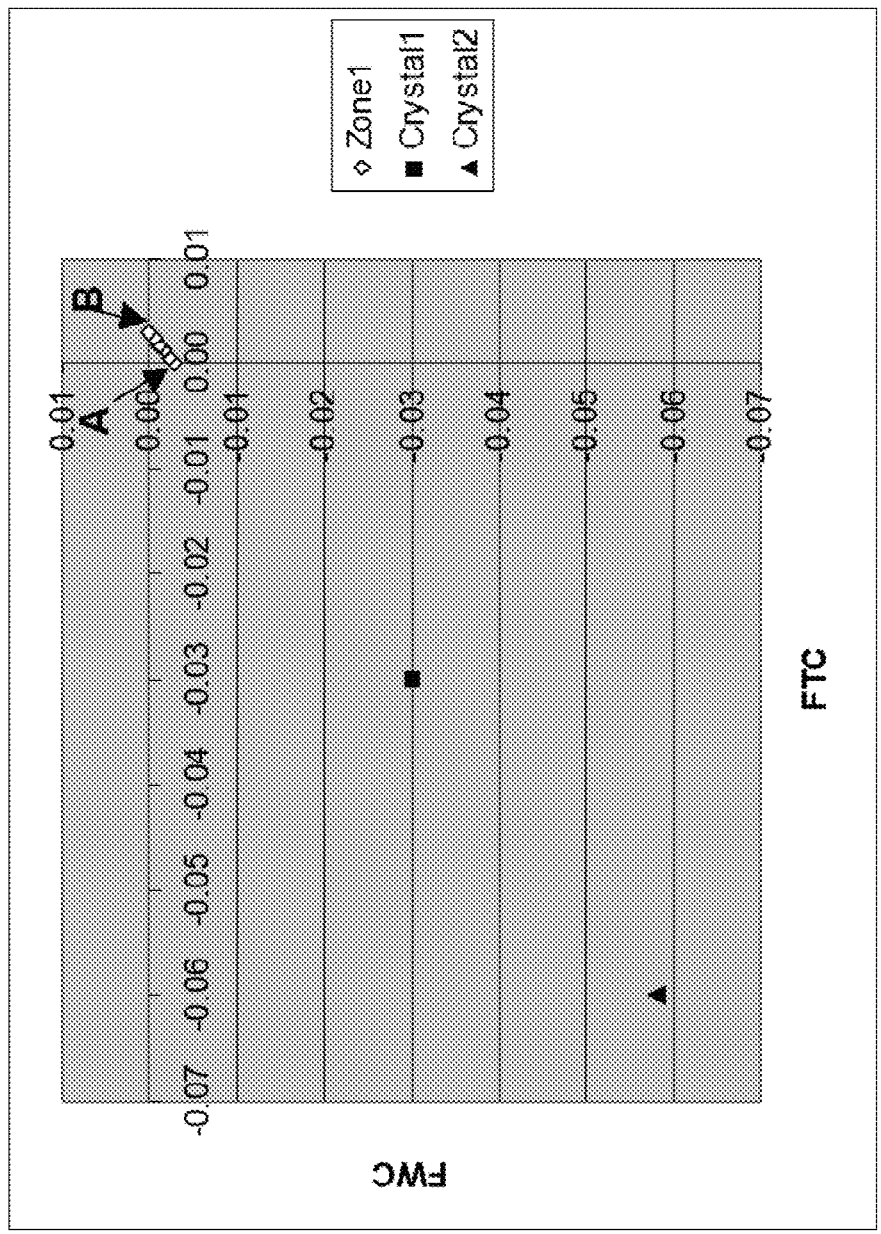
FIG. 4 is a graph showing a relationship between temperature and wavelength dependencies of individual crystals in the magneto-optical crystal assembly of FIG. 2 with a 45° rotation and temperature and wavelength dependencies of the magneto-optical crystal assembly of FIG. 2.
Figure 5:
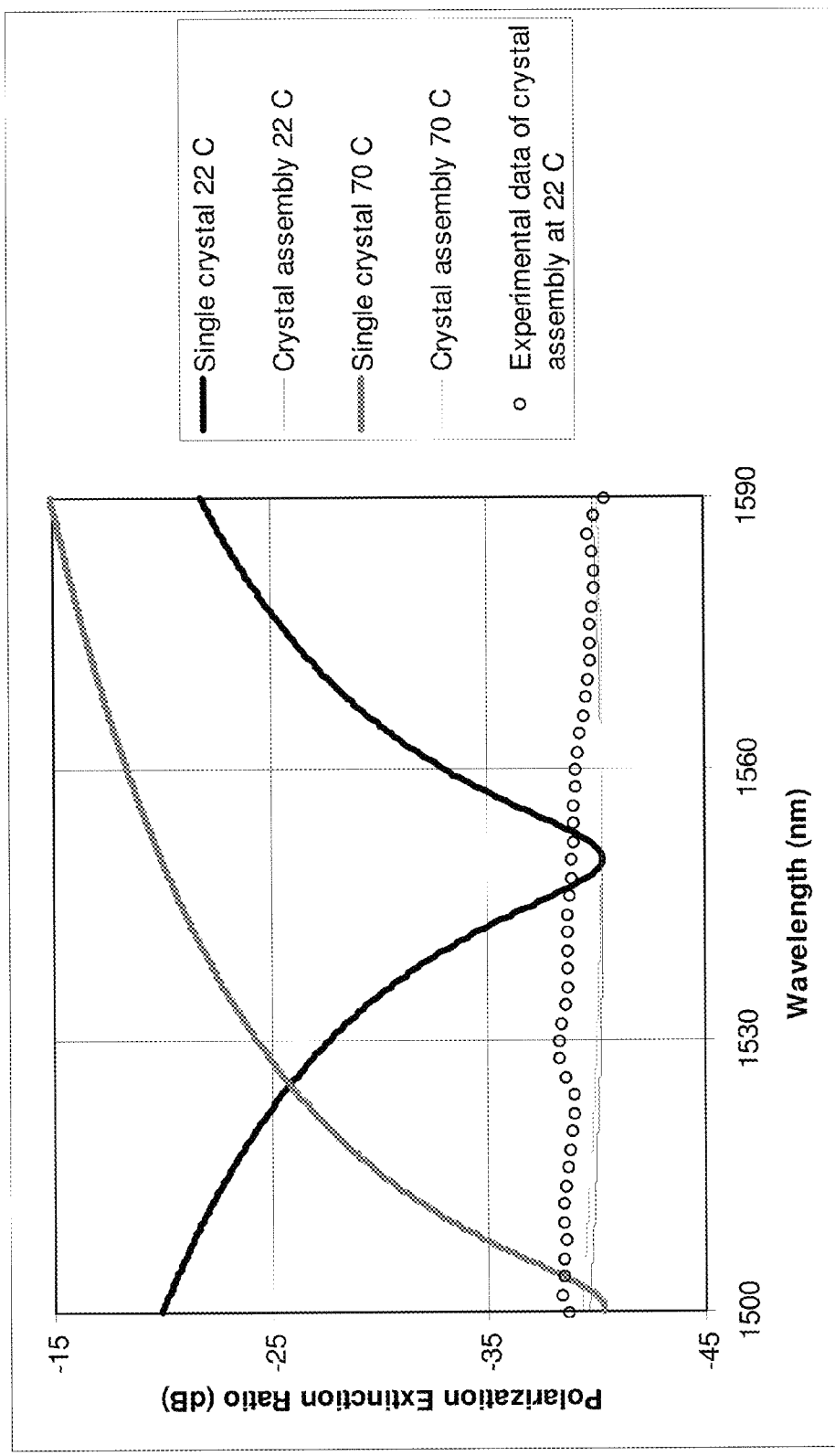
FIG. 5 is a graph showing improvement in polarization extinction ratio over broad wavelength and temperature ranges for the magneto-optical crystal assembly of FIG. 2.

In Embodiment 1, a magneto-optical crystal assembly includes two magneto-optic crystals with counter-rotating characteristics. Referring to FIG. 2, the magneto-optic crystal assembly 200 includes a first crystal 210 and a second crystal 220. In some embodiments, the magneto-optic crystal assembly 200 may further include an optical waveguide. Both crystals 210 and 220 are encompassed by an external magnet (not shown) having a magnetic field B axially aligned in a direction of propagation of light. A beam of light incident on the first crystal 210 is rotated 45° in a counter-clockwise direction. This rotated beam of light is then incident on the second crystal 220 and is rotated 90° in the clockwise direction under the same external magnetic field B. The first crystal 210 may be a diamagnetic material. Examples of the first crystal 210 include a thin film of bismuth-doped rare-earth iron garnet, mixed rare earth iron garnet, and samarium iron garnet. The second crystal 220 may be a paramagnetic material. Examples of the second crystal 220 include a bulk of single crystal of yttrium iron garnet (YIG), erbium iron garnet and thulium iron garnet. Respective absolute values of the wavelength coefficient and temperature coefficient of the two crystals 210 and 220 are chosen such that Equation (2) and (3) are optimized and, in this embodiment, (i) the wavelength coefficient of the first crystal 210 has a value substantially equal to two times that of the second crystal 220 (i.e., $\frac{1}{2}\omega_1 \cong \omega_2$) and that (ii) the temperature coefficient of the first crystal 210 has a value substantially equal to two times that of the second crystal 120 (i.e., $\frac{1}{2}\tau_1 \cong \tau_2$). The first crystal 210 and the second crystal 220 may be placed side by side and in contact inside the magnetic field B. Alternatively or additionally, the first crystal 210 and the second crystal 220 may be separated apart from each other. Alternatively, the first crystal 210 and the second crystal 220 may be grown on the same substrate. FIGS. 2 and 3 illustrate a method for selecting the first crystal 210 and the second crystal 220 to form the crystal assembly 200. Referring to FIG. 3, the first crystal 210 (indicated as Crystal 1 on the vertical axis) has a rotation of approximately 45° and the second crystal 220 (indicated as Crystal 2 on the horizontal axis) has a counter-rotation of approximately 90°. The FTC line represents required rotation for the temperature dependency to be exactly compensated for, with point A being a resultant total rotation of 45°. The FWC line represents required rotation for the wavelength dependency to be exactly compensated for, with point B being a resultant total rotation of 45°. Zone 1 in FIG. 3 thus encompasses a region of tradeoff between temperature dependency and wavelength dependency. FIG. 4 shows the temperature and wavelength coefficients of crystal 210 (Crystal 1) and crystal 220 (Crystal 2) individually with a 45° rotation and the temperature and wavelength coefficients of the crystal assembly 200. Again, Zone 1 in FIG. 4 encompasses a region of tradeoff between temperature dependency and wavelength dependency in the crystal assembly 200. Examples of the crystal assembly 200 and corresponding values of temperature and wavelength coefficients are listed in Table 1 below. As shown in FIG. 5, when Equations (1) is satisfied while Equations (2) and (3) are optimized per application requirements, crystal assemblies, e.g., crystal assembly 200, with both reduced temperature and wavelength dependencies over broad temperature and wavelength ranges may be obtained.

TABLE 1

Temperature and Wavelength Coefficients of Crystal Assembly

| | 45° - rotating Bi-doped rare-earth iron garnet | | - 90° - rotating YIG | | Crystal Assembly | |
|---|---|---|---|---|---|---|
| | τ (deg/° C.) | ω (deg/nm) | τ (deg/° C.) | ω (deg/nm) | τ (deg/° C.) | ω (deg/nm) |
| FLL | −0.065 | −0.070 | −0.059 | −0.060 | 0.006 | 0.010 |
| FLM | −0.060 | −0.058 | | | 0.001 | −0.002 |
| FLT | −0.045 | −0.058 | | | −0.014 | −0.002 |
| GLB | −0.065 | −0.070 | | | 0.006 | 0.010 |
| GSF | −0.070 | −0.065 | | | 0.011 | 0.005 |
| GTD | −0.045 | −0.060 | | | −0.014 | 0.000 |
| Mixed rare-earth 1 | −0.0025 | −0.022 | | | −0.057 | −0.038 |
| Mixed rare-earth 2 | −0.0525 | −0.0215 | | | −0.007 | −0.039 |
| Sample A | −0.0525 | −0.0045 | | | −0.007 | −0.056 |
| Sample B | −0.0525 | 0.036 | | | −0.007 | −0.096 |
| Sample C | −0.0525 | −0.0585 | | | −0.007 | −0.002 |

*All values listed are for a 1550 nm wavelength and 22° C. temperature.

Embodiment 2

Figure 6:
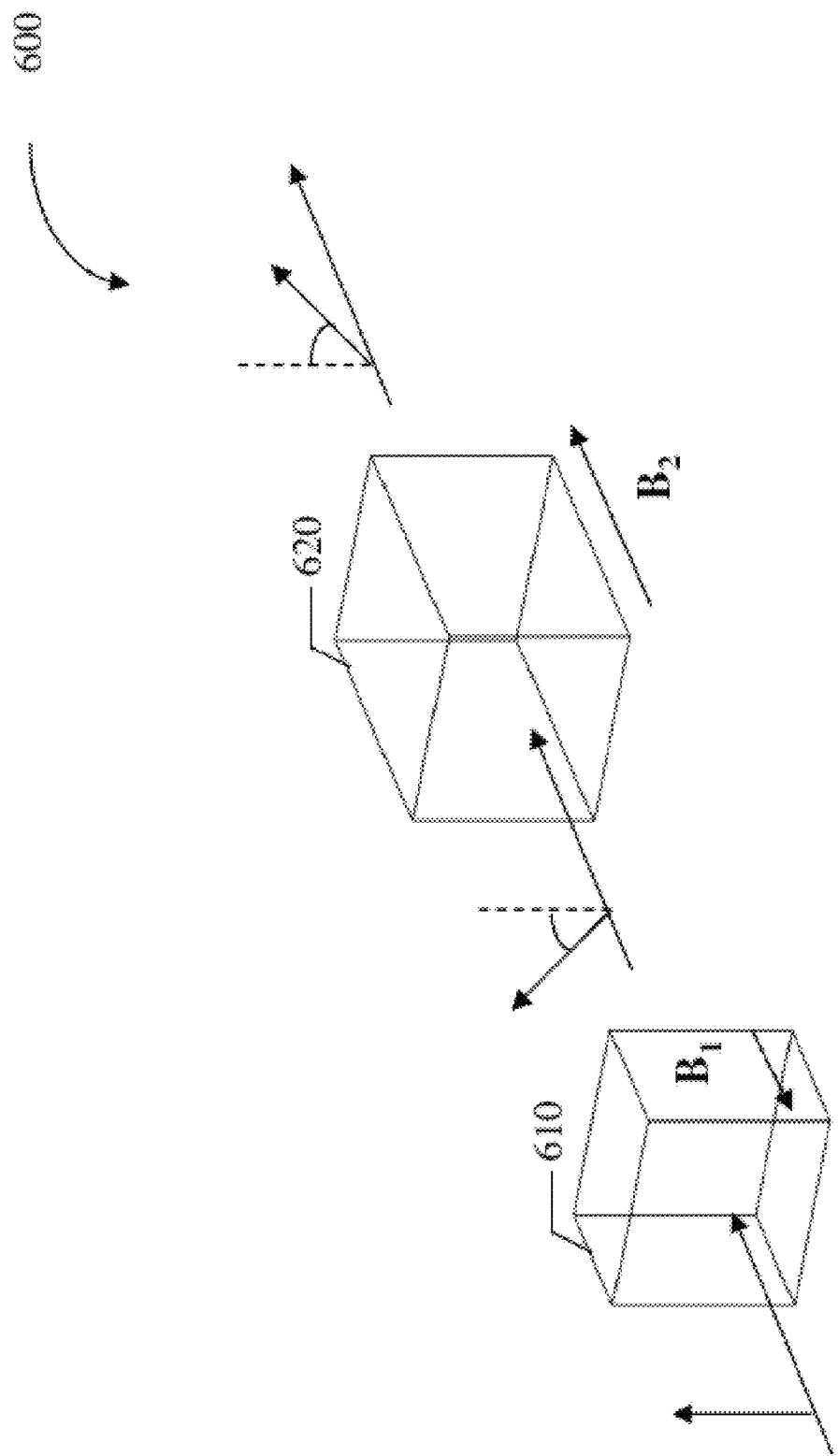
FIG. 6 is a diagram showing polarization rotation when light propagates through a magneto-optical crystal assembly under a given magnetic field B in accordance with another embodiment of the present disclosure.

Embodiment 2 differs from Embodiment 1 in that only the second crystal is placed inside an external magnet. Referring to FIG. 6, a magneto-optic crystal assembly 600 includes a first crystal 610, with a permanent internal magnetic field $B_1$, and a second crystal 620 spaced apart from the first crystal 610. In some embodiments, the magneto-optic crystal assembly 600 may further include an optical waveguide. The second crystal 620 is encompassed within an external magnet (not shown) having a magnetic field $B_2$ axially aligned in a direction of propagation of light. A beam of light incident on the first crystal 610 undergoes 45° polarization rotation in a counterclockwise direction, and then undergoes 90° polarization rotation in a clockwise direction after incidence on the second crystal 620. The resulting total polarization rotation is 45°. The separation distance of crystals 610 and 620 will depend on the strength of both magnetic fields such that crystals 610 and 620 can function as designated. The first crystal 610 may be a diamagnetic material. Examples of the first crystal 610 include bismuth-doped rare-earth iron garnet, mixed rare-earth iron garnet, and samarium iron garnet. The second crystal 620 may be a paramagnetic material. Examples of the second crystal 620 include yttrium iron garnet (YIG), erbium iron garnet and thulium iron garnet. Respective absolute values of the wavelength coefficient and temperature coefficient of the two crystals 610 and 620 are chosen such that Equations (2) and (3) are optimized and, in this embodiment, (i) the wavelength coefficient of the first crystal 610 has a value substantially equal to two times that of the second crystal 620 (i.e., $\frac{1}{2}\omega_1 \cong \omega_2$) and that (ii) the temperature coefficient of the first crystal 610 has a value substantially equal to two times that of the second crystal 620 (i.e., $\frac{1}{2}\tau_1 \cong \tau_2$). The crystal assembly 600 possesses reduced temperature and wavelength dependencies over broad temperature and wavelength ranges. Examples of the crystal assembly 600 and corresponding values of temperature and wavelength coefficients are listed in Table 2 below.

TABLE 2

Temperature and Wavelength Coefficients of Crystal Assembly

|  | 45° - rotating Bi-doped rare-earth iron garnet | | - 90° - rotating YIG | | Crystal Assembly | |
| --- | --- | --- | --- | --- | --- | --- |
|  | τ (deq/° C.) | ω (deg/nm) | τ (deg/° C.) | ω (deg/nm) | τ (deg/° C.) | ω (deg/nm) |
| MGL | −0.093 | −0.068 | −0.059 | −0.060 | 0.034 | 0.008 |
| GMF | −0.070 | −0.065 |  |  | 0.011 | 0.005 |

Embodiment 3

Figure 7:
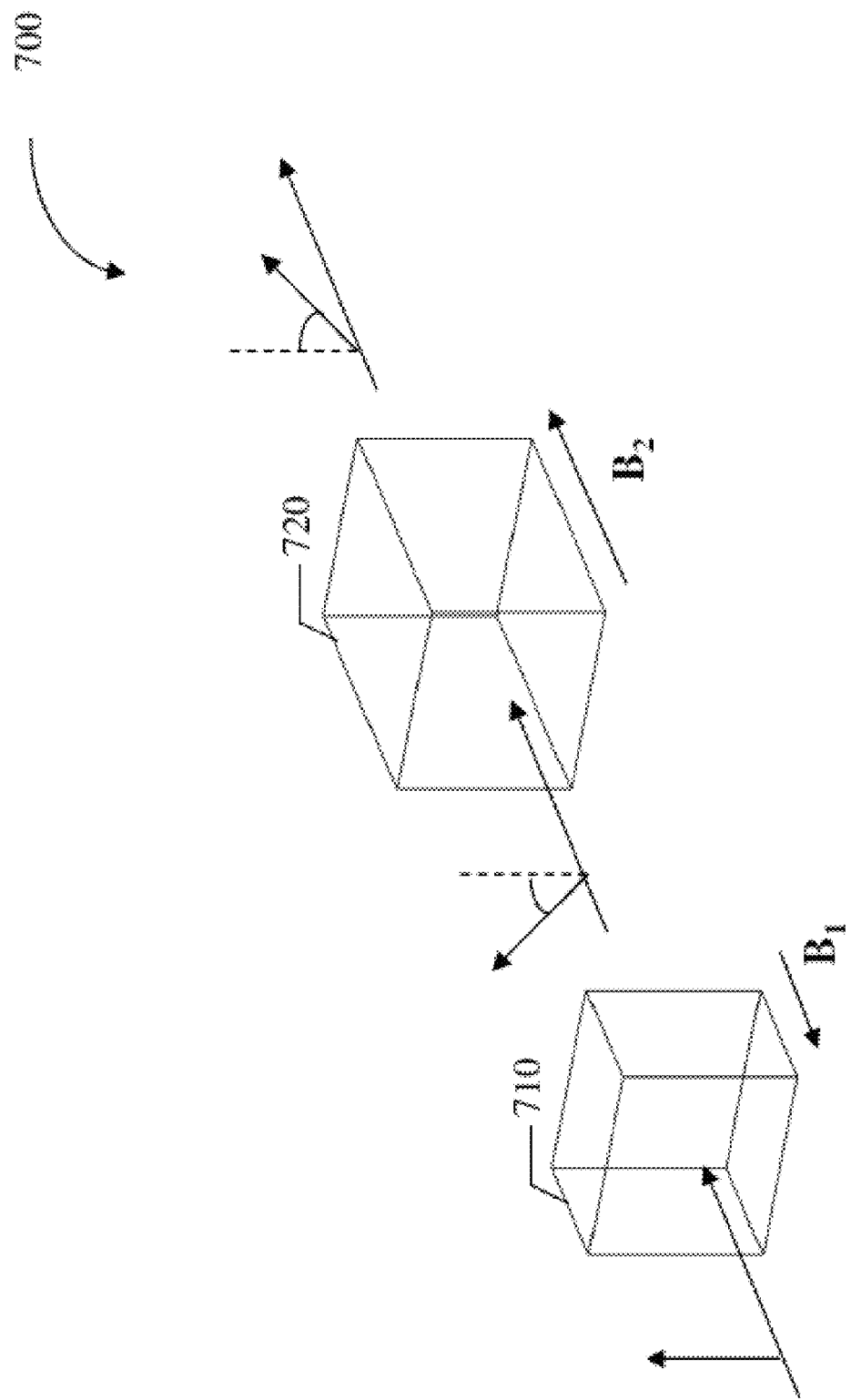
FIG. 7 is a diagram showing polarization rotation when light propagates through a magneto-optical crystal assembly under a given magnetic field B in accordance with yet another embodiment of the present disclosure.

In Embodiment 3, the magneto-optical crystal assembly is formed by two crystals which are both either diamagnetic or paramagnetic. Referring to FIG. 7, a magneto-optic crystal assembly 700 includes a first crystal 710 and a second crystal 720. In some embodiments, the magneto-optic crystal assembly 700 may further include an optical waveguide. The first crystal 710 is placed inside a first external magnet (no shown) having a first magnetic field $B_1$. The second crystal 720 is placed inside a second external magnet (not shown) with a second magnetic field $B_2$ axially aligned in a direction of propagation of light. The second magnetic field $B_2$ is anti-aligned with the first magnetic field $B_1$, so that a crystal assembly that is counter-rotating is created. This configuration would require the first crystal 710 be separated from the second crystal 720. This separation is required such that both crystal 710 and 720 can function as designated under its respective magnetic field. A beam of light incident on the first crystal 710 undergoes 45° polarization rotation in a counterclockwise direction, and then undergoes 90° polarization rotation in a clockwise direction after incidence on the second crystal 720. The resulting total polarization rotation is 45°. Respective absolute values of the wavelength coefficient and temperature coefficient of the two crystals 710 and 720 are chosen such that Equations (2) and (3) are optimized and, in this embodiment, (i) the wavelength coefficient of the first crystal 710 has a value substantially equal to two times that of the second crystal 720 (i.e., $\frac{1}{2}\omega_1 \cong \omega_2$) and that (ii) the temperature coefficient of the first crystal 710 has a value substantially equal to two times that of the second crystal 720 (i.e., $\frac{1}{2}\tau_1 \cong \tau_2$).

Embodiment 4

Embodiment 4 is an example for achieving exact compensation for both temperature and wavelength dependencies. Approximate compensation for both temperature and wavelength dependencies may be attained in Embodiments 1-3 as described above because in those cases there were two unknown variables for three equations, with the unknown variables being the respective Faraday rotation angle for each of the two crystals. In general, three equations with three unknown variables will have a well-defined solution. Thus, solving Equations (1)-(3) may provide an exact compensation for temperature and wavelength dependencies (i.e., Equations (2) and (3) equal to 0, not just optimized). In Embodiment 4, a magneto-optic crystal assembly including three crystals is provided. When the pre-determined total rotation angle Θ is 45°, Equations (1)-(3) will be solved as shown below, namely Equations (4)-(6). When the pre-determined total rotation angle is 45°, a respective polarization rotation angle of each of the magneto-optic crystals will be determined as shown in Equations (7)-(9). The solution shown below may be used to determine which two crystals should be co-rotating and which crystal should be counter-rotating (having positive or negative rotation angles). The specific magnetic requirements for each crystal will determine whether a single magnet or multiple magnets should be used. This approach provides an exact compensation for temperature and wavelength dependencies irrespective of actual crystal choice.

$$\theta_1 = \Theta - \theta_2 - \theta_3 \quad (4)$$

$$\theta_2 = \frac{(\theta_3 - \Theta)\tau_1 - \theta_3 \tau_3}{(\tau_2 - \tau_1)} \quad (5)$$

$$\theta_3 = \frac{\Theta\left(\frac{(\tau_1\omega_2 - \tau_1\omega_1)}{(\tau_2 - \tau_1)} - \omega_1\right)}{\omega_3 - \omega_1 + \frac{(\tau_3 - \tau_1)(\omega_1 - \omega_2)}{(\tau_2 - \tau_1)}} \quad (6)$$

$$\theta_1 = 45 - \theta_2 - \theta_3 \quad (7)$$

$$\theta_2 = \frac{(\theta_3 - 45)\tau_1 - \theta_3 \tau_3}{(\tau_2 - \tau_1)} \quad (8)$$

$$\theta_3 = \frac{45\left(\frac{(\tau_1\omega_2 - \tau_1\omega_1)}{(\tau_2 - \tau_1)} - \omega_1\right)}{\omega_3 - \omega_1 + \frac{(\tau_3 - \tau_1)(\omega_1 - \omega_2)}{(\tau_2 - \tau_1)}} \quad (9)$$

These embodiments may be used together or individually to create the rotating elements in optical isolators, circulators, and Faraday rotating mirrors along with such optics as polarizers, birefringent crystals, polarizing beam splitters, half-wave plates and quarter-wave plates. These rotating elements allow a desired value of isolation to be maintained across wider wavelength and temperature ranges for isolators and circulators, or rotation angle to be maintained in the case of Faraday rotating mirrors.

Figure 8:
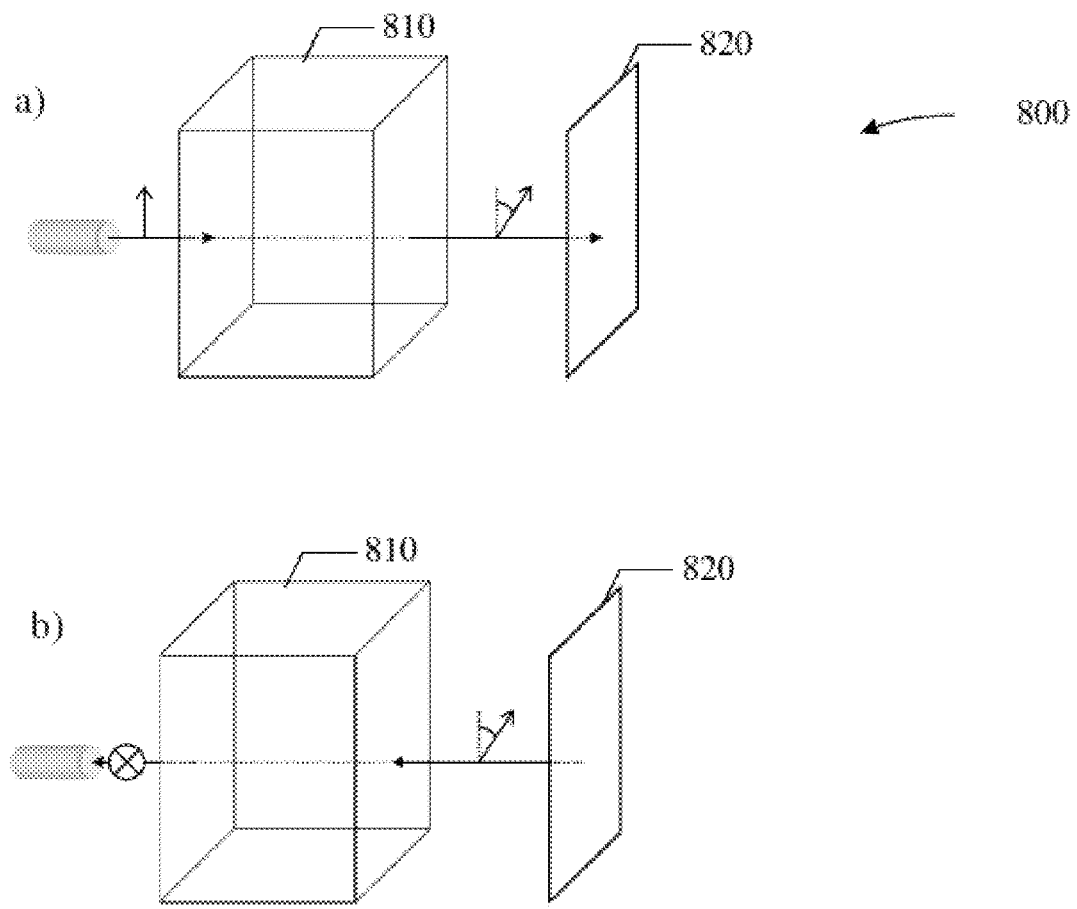
FIG. 8 is a diagram showing polarization rotation when light propagates through a Faraday rotating mirror with a magneto-optical crystal assembly in accordance with yet another embodiment of the present disclosure.

Referring to FIG. 8, one embodiment of a Faraday rotating mirror may include one of the four previous embodiments of the rotating element crystal assembly 810 and a flat mirror 820. The magneto-optic crystal assembly 800 may be such that incoming light would rotate 45° upon passing the rotating element 810, then reflected light from mirror 820 may then again be rotated 45° through rotating element 810, for a combined rotation of 90°, and exit the device with a polarization entirely perpendicular to its incident state for the designed wavelengths and temperatures. The proposed design of rotating elements advantageously allows a desired value of rotation angle to be maintained across wider wavelength and temperature ranges for Faraday rotating mirrors.

Figure 9:
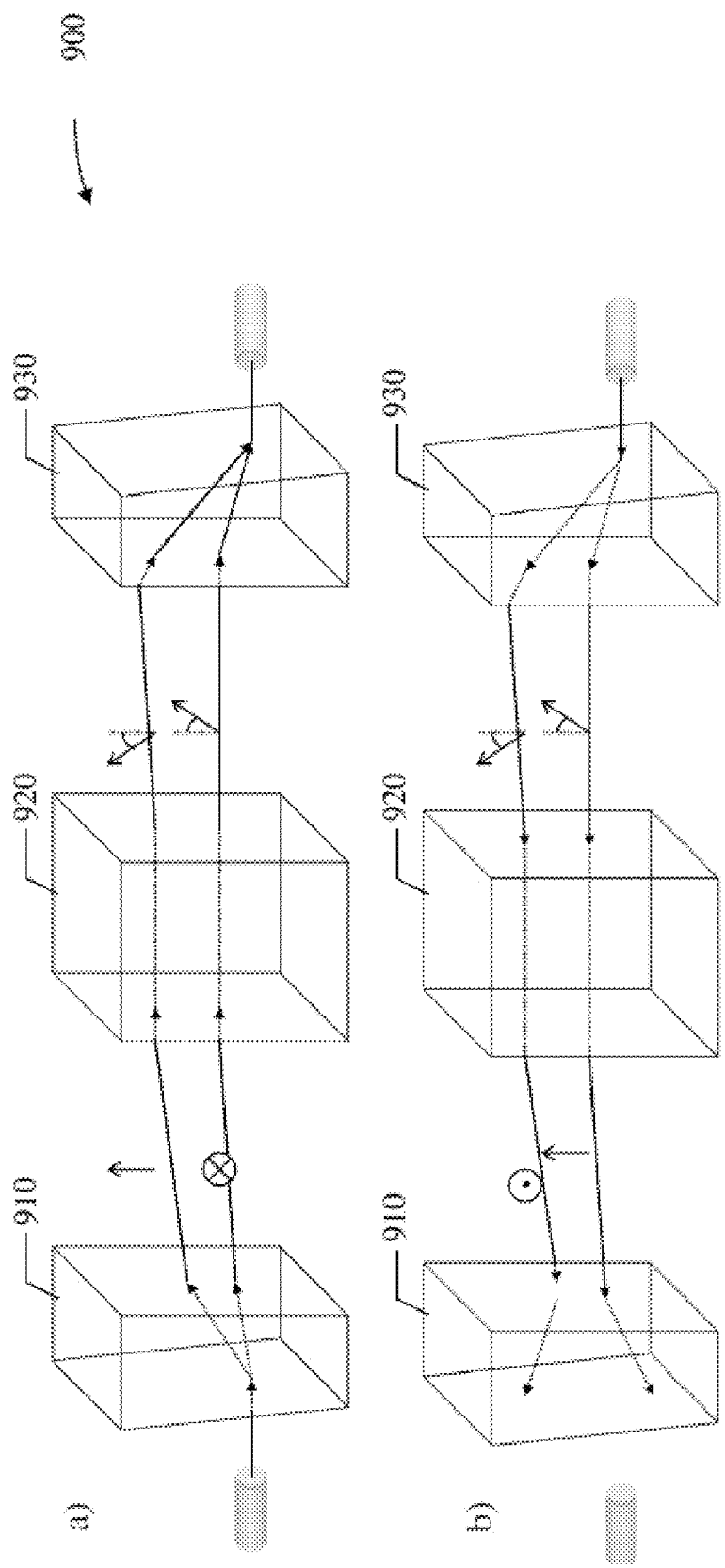
FIG. 9 is a diagram showing polarization rotation when light propagates through an optical isolator with a magneto-optical crystal assembly in accordance with yet another embodiment of the present disclosure.

Referring to FIG. 9, one embodiment of the isolator may include one of the four previous embodiments of the rotating element crystal assembly 920 and two birefringent crystals 910 and 930. The optical axes for crystals 910 and 930 are 45° are apart from each other in the plane of rotation for the rotating element. These two crystals may be arranged around the rotating element such that the forward propagating light incident upon 910 will be split into two paths for E-wave and O-wave polarizations. These two paths may be incident upon the rotating element 920 and may exit the rotating element at 45° from its incident polarization. These two paths may then be recombined in the second birefringent crystal 930 at the respective E-wave and O-wave polarization. Reverse propagating light may be incident on 930 and separate into two paths in the same way the forward propagating light did. These two paths may then be incident on the rotating element 920 and the polarization will be rotated 45° in the same direction. Since the optical axes of crystals 910 and 930 are 45° apart, the total polarization rotation of both E and O waves will be 90° relative to the optical axis of crystal 910. Thus E-wave light incident upon the first birefringent crystal 910 will behave as an O-wave and vice versa for the incident O-wave, and therefore the paths will diverge. The proposed design of rotating elements advantageously allows a desired value of isolation to be maintained across wider wavelength and temperature ranges for isolators.

Figure 10:
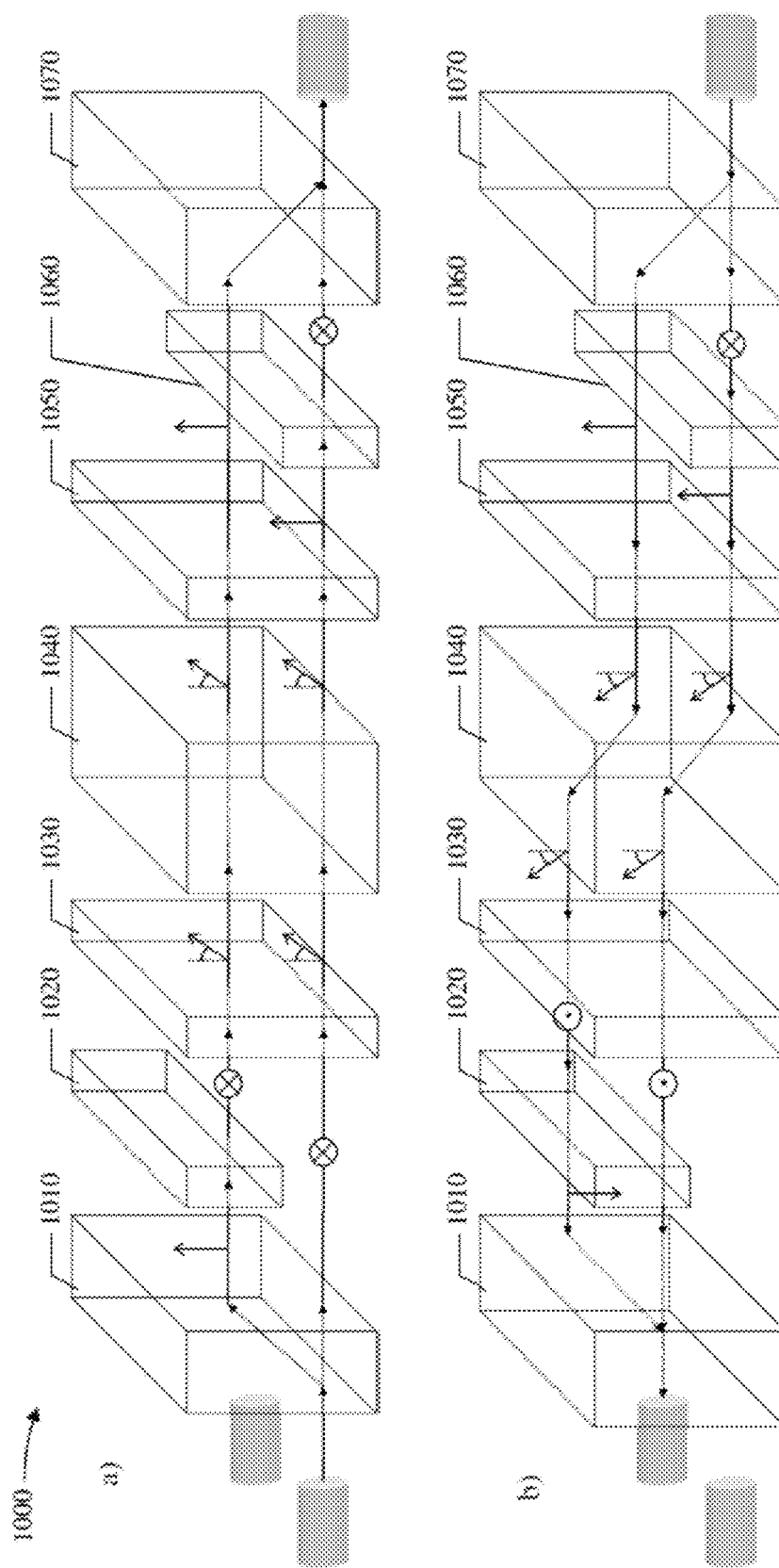
FIG. 10 is a diagram showing polarization rotation when light propagates through an optical circulator with a magneto-optical crystal assembly in accordance with yet another embodiment of the present disclosure.

Referring to FIG. 10, one embodiment of a 3-port circulator may include two of the four previous embodiments of the rotating element crystal assembly 1030 and 1050, three birefringent crystals 1010, 1040, and 1070, and two quarter-wave plates 1020 and 1060. Two of the birefringent crystals 1010 and 1070 may be cut so that the optical axes are vertical and arranged in opposing directions. The third birefringent crystal 1040 may be cut so that the optical axis is horizontal. These crystals may be arranged around the rotating element such that forward propagating light incident upon 1010 will be split into two paths for the corresponding polarizations. One of these two paths may be incident upon quarter-wave plate 1020. The two paths now having the same polarization may be incident on the rotating element 1030 and may exit the rotating element at 45° from its incident polarization. Both paths may propagate in the same direction through 1040 and be incident upon the second rotating element 1050. One of the paths may then be incident upon the second quarter-wave plate 1060. The two now perpendicular paths may recombine in the second birefringent crystal. Reverse propagating light may travel similar paths until it is incident upon 1040, here the polarization will be 90° to the forward propagation and both paths will be displaced sideways. These two paths may then be incident on the rotating element 1030 and the polarization will be rotated 45°. Lastly one path may be incident upon quarter-wave plate 1020 before recombining in the first birefringent crystal 1010 and being directed to the third port. The proposed design of rotating elements advantageously allows a desired value of isolation to be maintained across wider wavelength and temperature ranges for circulators.

The various embodiments of the magneto-optic crystal assembly as described in the present disclosure may be implemented in devices, apparatuses and systems such as, for example, an optical isolator, an optical circulator, a Faraday rotating mirror, and/or a phase conjugate mirror having the Faraday rotating mirror that includes the magneto-optic crystal assembly of the present disclosure. Thus, the protective scope of the present disclosure also covers embodiments of an optical isolator, an optical circulator, a Faraday rotating mirror, and a phase conjugate mirror having the Faraday rotating mirror that includes the magneto-optic crystal assembly of the present disclosure.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A magneto-optic crystal assembly, comprising:
two or more magneto-optic crystals, a respective Faraday effect of each of the magneto-optic crystals is configured such that equation (1) is satisfied while equations (2) and (3) are optimized per application requirements to obtain reduced temperature and wavelength dependencies over predefined temperature and wavelength ranges:

$$\sum_{i=1}^{n} \theta_i = \Theta \quad (1)$$

$$\sum_{i=1}^{n} \theta_i \omega_i = 0 \quad (2)$$

$$\sum_{i=1}^{n} \theta_i \tau_i = 0 \quad (3)$$

wherein:
n is a number of magneto-optic crystals contained in the crystal assembly,
$\theta_i$ is a polarization rotation angle of each of the magneto-optic crystals at a given wavelength,
$\Theta$ is a pre-determined total polarization rotation angle,
$\omega_i$ is a wavelength coefficient of Faraday rotation for each of the magneto-optic crystals at a given wavelength and a given temperature,
$\tau_i$ is a temperature coefficient of Faraday rotation for each of the magneto-optic crystals at the given wavelength and the given temperature,
the two or more magneto-optic crystals comprise at least a first magneto-optic crystal having first wavelength and temperature coefficients and a second magneto-optic crystal having second wavelength and temperature coefficients such that the first wavelength and temperature coefficients compensate the second wavelength and temperature coefficients.

2. The magneto-optic crystal assembly of claim 1, wherein the two or more magneto-optic crystals comprise a counter-rotating crystal assembly.

3. The magneto-optic crystal assembly of claim 2, wherein at least one of the two or more magneto-optic crystals comprises bismuth-doped rare-earth iron garnet, and wherein at least one of the two or more magneto-optic crystals comprises yttrium iron garnet (YIG).

4. The magneto-optic crystal assembly of claim 1, wherein the two or more magneto-optic crystals are placed inside an external magnetic field.

5. The magneto-optic crystal assembly of claim 1, wherein the two or more magneto-optic crystals are placed sequentially and in contact.

6. The magneto-optic crystal assembly of claim 1, wherein the two or more magneto-optic crystals are crystals grown on a same substrate.

7. The magneto-optic crystal assembly of claim 6, further comprising an optical waveguide.

8. The magneto-optic crystal assembly of claim 1, wherein the two or more magneto-optic crystals are spaced apart.

9. The magneto-optic crystal assembly of claim 1, wherein at least one of the two or more magneto-optic crystals has a permanent internal magnetic field, and wherein at least one of the two or more magneto-optic crystals is placed inside an external magnetic field.

10. The magneto-optic crystal assembly of claim 2, wherein the polarization rotation angle of the first crystal is substantially 45° in a first direction and the polarization rotation angle of the second crystal is substantially 90° in a second direction opposite to the first direction, wherein an absolute value of the wavelength coefficient of Faraday rotation of the first crystal is substantially equal to two times of that of the second crystal, and wherein an absolute value of the temperature coefficient of Faraday rotation of the first crystal is substantially equal to two times of that of the second crystal.

11. The magneto-optic crystal assembly of claim 1, wherein the two or more magneto-optic crystals comprise a first crystal, placed inside a first external magnet having a first magnetic field, and a second crystal, placed inside a second external magnet having a second magnetic field.

12. The magneto-optic crystal assembly of claim 10, wherein at least one of the two or more magneto-optic crystals comprises bismuth-doped rare-earth iron garnet.

13. The magneto-optic crystal assembly of claim 11, wherein at least one of the two or more magneto-optic crystals comprises yttrium iron garnet (YIG), and wherein at least one of the two or more magneto-optic crystals comprises cerium-doped rare-earth iron garnet.

14. The magneto-optic crystal assembly of claim 11, wherein the polarization rotation angle of the first crystal is substantially 45° in a first direction and the polarization rotation angle of the second crystal is substantially 90° in a second direction opposite to the first direction, wherein an absolute value of the wavelength coefficient of Faraday rotation of the first crystal is substantially equal to two times of that of the second crystal, and wherein an absolute value of the temperature coefficient of Faraday rotation of the first crystal is substantially equal to two times of that of the second crystal.

15. The magneto-optic crystal assembly of claim 1, wherein the two or more magneto-optic crystals comprise a co-rotating crystal assembly.

16. The magneto-optic crystal assembly of claim 15, wherein at least one of the two or more magneto-optic crystals comprises yttrium iron garnet (YIG), and wherein at least one of the two or more magneto-optic crystals comprises a co-rotating magneto-optic crystal.

17. The magneto-optic crystal assembly of claim 1, wherein the two or more magneto-optic crystals are made of bulk materials.

18. The magneto-optic crystal assembly of claim 1, wherein the magneto-optic crystal assembly comprises crystals not requiring an external magnet for magneto-optic functioning.

19. A magneto-optic crystal assembly, comprising:
a first magneto-optic crystal;
a second magneto-optic crystal; and
a third magneto-optic crystal,
wherein a respective polarization rotation angle of each of the magneto-optic crystals is configured such that the following equations (4) - (6) are satisfied simultaneously to obtain exact compensation for both temperature and wavelength decencies over predefined temperature and wavelength ranges:

$$\theta_1 = \Theta - \theta_2 - \theta_3 \qquad (4)$$

$$\theta_2 = \frac{(\theta_3 - \Theta)\tau_1 - \theta_3\tau_3}{(\tau_2 - \tau_1)} \qquad (5)$$

$$\theta_3 = \frac{\Theta\left(\frac{(\tau_1\omega_2 - \tau_1\omega_1)}{(\tau_2 - \tau_1)} - \omega_1\right)}{\omega_3 - \omega_1 + \frac{(\tau_3 - \tau_1)(\omega_1 - \omega_2)}{(\tau_2 - \tau_1)}} \qquad (6)$$

wherein:
$\Theta$ is a pre-determined total polarization rotation angle,
$\theta_1$, $\theta_2$, and $\theta_3$ are polarization rotation angles of the first, the second and the thirds magneto-optic crystals at a given wavelength, respectively,
$\omega_1$, $\omega_2$, and $\omega_3$ are wavelength coefficients of Faraday rotation of the first, the second, the third magneto-optic crystals at a given wavelength and a given temperature, respectively, and
$\tau_1$, $\tau_2$, and $\tau_3$ are temperature coefficients of Faraday rotation of the first, the second, and the third magneto-optic crystals at the given wavelength and the given temperature, respectively.

20. The magneto-optic crystal assembly of claim 19, wherein the pre-determined total polarization rotation angle is 45°.

* * * * *